Sept. 5, 1939.  A. T. KIEFT  2,172,140
DISH STRUCTURE
Filed Feb. 21, 1938  2 Sheets-Sheet 1
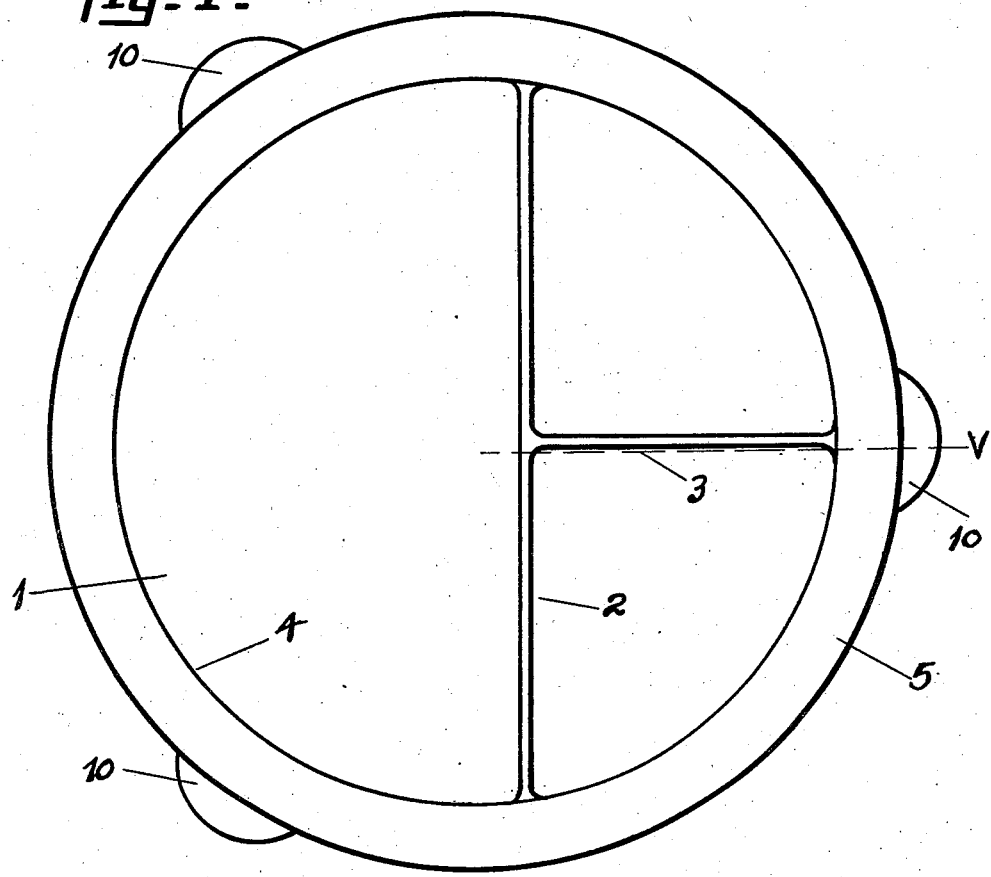
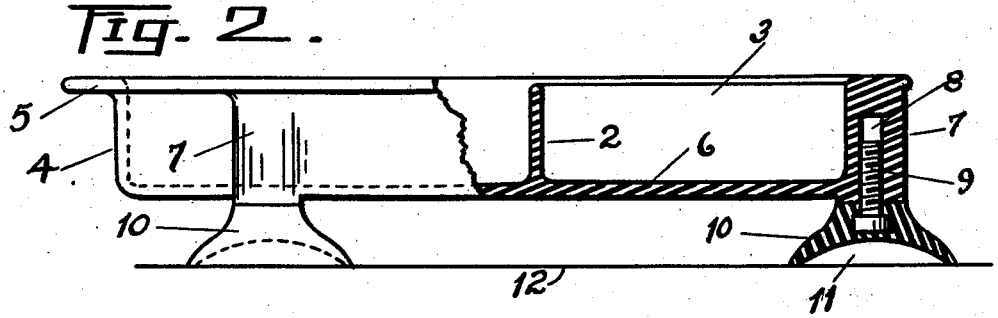
INVENTOR
BY Abram T. Kieft
Charles W. Dake
ATTORNEY

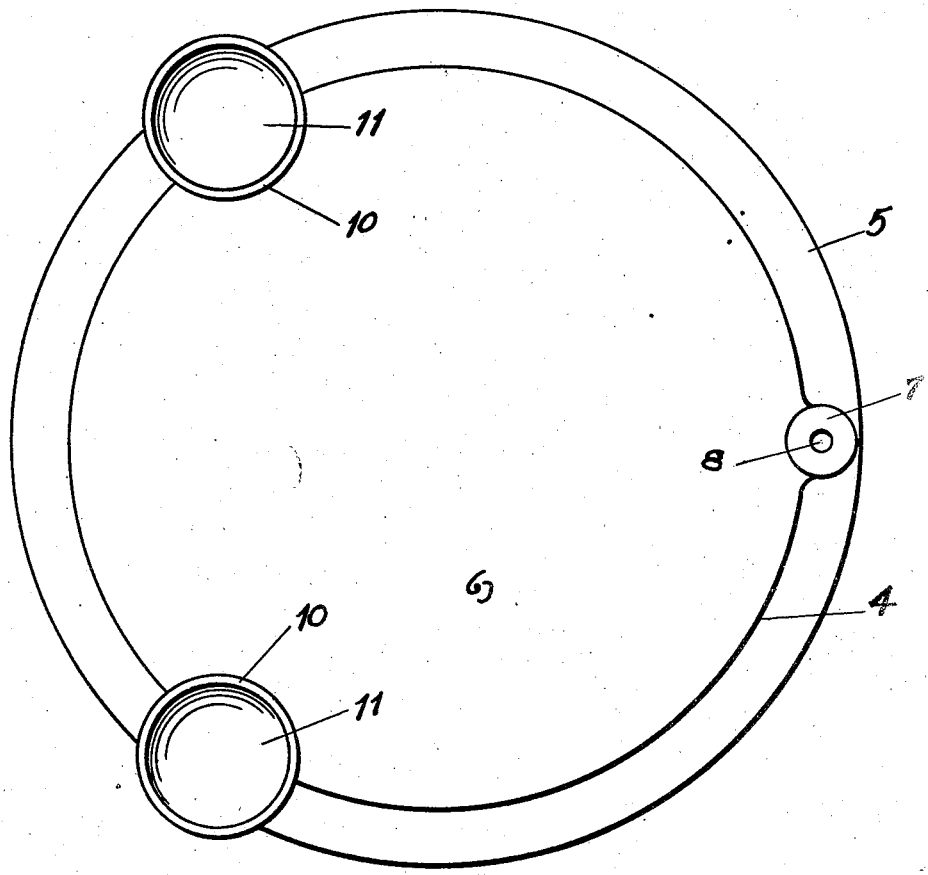

Patented Sept. 5, 1939

2,172,140

UNITED STATES PATENT OFFICE 2,172,140

DISH STRUCTURE

Abram T. Kieft, Grand Haven, Mich.

Application February 21, 1938, Serial No. 191,600

1 Claim. (Cl. 65—15)

My present invention relates to improvements in dishes and particularly to dish structures that may be secured to the top of a table, shelf or the like by differential of atmospheric pressure, which is usually referred to as suction and which structure is of a similar order as the dish structure described in my co-pending patent applications, Serial Nos. 83,324 and 187,201, filed August 11, 1937 and January 27, 1938, respectively, of which the former has issued as Patent Number 2,108,863 of Feb. 22, 1938; and the objects of my present invention are, first, to provide a dish structure that will be lighter than if made of glass, porcelain or pottery ware; second, to provide a dish structure whereof the food container will not break when dropped; third, to provide a dish structure that will be extremely cheap to manufacture, thereby permitting sale by stores dealing in cheap goods such as the so-called dime stores; fourth, to provide a dish structure whereof the container portion can be of figured or mottled appearance; and, fifth, to provide a dish structure of a non-metallic material that can be pressed to form and of plastic material.

I attain these herein named objects by the structure hereinafter described with the assistance of the accompanying drawings, in which:

Figure 1 is a top plan view illustrating the food container interior divided into three compartments with a portion of the retaining cups extending beyond the marginal edge of the container.

Figure 2 is a side elevation of my improved dish structure partly in section, as on line V of Fig. 1, extending radially through one of the retaining cups and boss to which the said cup is secured.

Figure 3 is an under side view of the dish structure illustrating two of the retaining cups as secured to the food container portion and one retainer cup removed to show one of the bosses to which the retainer cups are secured.

Referring to the said views of the drawings, similar numerals refer to similar parts or portions of my improved dish structure as follows, and in which:

Numeral 1 refers to the food container portion pressed of non-shatterable colored material and having its interior divided into three food portions by portion 2 extending transversely across the container portion 1 and the partition 3 extending from partition 2 to the surrounding wall 4 of the food container 1 and which has at its top outwardly extending flange or rim 5 from which extends downward at the outer side of the said food container 1, to below the bottom 6 thereof; semicircular bosses 7 having therein upwardly extending screw-threaded hole 8 into which is screwed the threaded shank of headed screws 9 having their heads embedded into and surrounded by the soft material of the rubber of the retaining cups 10 into which, at their bottom are compressible chambers 11. Numeral 12 represents a table top, shelf or other like surface to which the dish structure may be attached, by placing the dish structure thereon and pressing it firmly thereagainst with sufficient force to bend the surrounding walls of the retainer cups and collapse the chambers 11 and thereby cause a differential of atmospheric pressure between that at the inside of the cups than that on the outside thereof.

In the manufacture of my improved dish structure, having provided a suitable power press and forming dies, I mount the dies in the said press and having provided the plastic material, such as a pitch gum or material similar to Bakelite, which hardens to an unshatterable material, I place a sufficient quantity of the plastic material to form the food container of the dish structure between the members of the dies and cause the press to squeeze the said plastic material to form or shape between the plunger and die portion of the dies, which in so doing produces the food container portion of my dish structure.

In producing the food container of the dish structure, by employing several different colored pitches and only partly mixing them, a figured or mottled finish can be produced at the surfaces exposed, or the same effect can be obtained by the use of different colored Bakelite, it being understood that the material employed in the making of the food container of my dish structure is immaterial except, that the material should be of a plastic nature that hardens into an unshatterable material during the operation of pressing or thereafter.

In preparing my present improved dish for use, the procedure is similar to that of preparing my dish disclosed in my aforesaid patent applications, and consists in placing the dish structure on any horizontal support similar to the top of a table or shelf, pressing downwardly on the food container portion until the retaining cup members are distorted and the chambers therein are compressed, then allowing the structure to assume a normal form, when the dish cannot be removed from its support without great effort, and not at all by a child, by whom the dish structure is intended to be used.

Having described my present improved dish structure, the rights I desire to secure are set forth in the ensuing claim, as follows:

A dish structure having a food container provided with a plurality of semi-circular vertical extending lugs in spaced apart relation at the outer periphery of the dish's wall and extending below the bottom of the food container, each of said lugs having extending upward therein a screw threaded hole and a deformable retaining member having a screw embedded therein and extending into the said screw threaded hole.

ABRAM T. KIEFT.